US007734766B2

(12) United States Patent
Yamashita

(10) Patent No.: US 7,734,766 B2
(45) Date of Patent: Jun. 8, 2010

(54) COMMUNICATION DEVICE UTILIZING EMAIL FOR REMOTE PROCEDURE CALLS

(75) Inventor: Makoto Yamashita, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1334 days.

(21) Appl. No.: 11/112,226

(22) Filed: Apr. 22, 2005

(65) Prior Publication Data

US 2005/0262211 A1    Nov. 24, 2005

(30) Foreign Application Priority Data

Apr. 23, 2004    (JP)    ............... 2004-128300

(51) Int. Cl.
   *G06F 15/173*    (2006.01)
(52) U.S. Cl. ...................... 709/224; 719/330
(58) Field of Classification Search ............... 709/203, 709/206, 224; 719/330; 714/55
   See application file for complete search history.

(56) References Cited

U.S. PATENT DOCUMENTS

| | | | | |
|---|---|---|---|---|
| 6,411,393 | B1 * | 6/2002 | Wakasugi | .................. 358/1.15 |
| 6,879,995 | B1 * | 4/2005 | Chinta et al. | ................ 709/204 |
| 7,028,312 | B1 * | 4/2006 | Merrick et al. | .............. 719/330 |
| 7,051,335 | B2 * | 5/2006 | Gehring et al. | ............. 719/315 |
| 7,146,427 | B2 * | 12/2006 | Delaney et al. | ............. 709/237 |
| 7,353,213 | B2 * | 4/2008 | Ryan et al. | ................... 705/401 |
| 2004/0167912 | A1 * | 8/2004 | Tsui et al. | .................... 707/100 |
| 2006/0179133 | A1 * | 8/2006 | Mariani et al. | .............. 709/223 |
| 2007/0136592 | A1 * | 6/2007 | Smith | ......................... 713/171 |

FOREIGN PATENT DOCUMENTS

JP    3120349 B2    12/2000

JP    2003-114805 A    4/2003

OTHER PUBLICATIONS

Lin et al., An asynchronous remote procedure call system for heterogeneous programming, Mar. 30, 1991, Tenth Annual International Phoenix Conference on Computers and Communications (Cat. No. 91CH2959-5), pp. 153-159.*

* cited by examiner

*Primary Examiner*—Nathan Flynn
*Assistant Examiner*—James E Conaway
(74) *Attorney, Agent, or Firm*—Panitch Schwarze Belisario & Nadel LLP

(57) ABSTRACT

To enable communication in accordance with a RPC through a firewall in using email, the server-side communication device has a mail transmitting and receiving unit and an information converting unit for retrieving instruction information from an email received with the mail transmitting and receiving unit, for outputting the instruction information to a RPC server, for converting response information corresponding to the instruction information into a return email to a client-side communication device 7, in which the mail transmitting and receiving unit transmits the return email output with the information converting unit to the client-side communication device. On the other hand, the client-side communication device has a mail transmitting and receiving unit and an information converting unit for outputting the email to the mail transmitting and receiving unit after converting the instruction information transmitted to the server-side communication device into the email, for retrieving the response information corresponding to the instruction information from the received email, for outputting the response information to a RPC client unit, in which the mail transmitting and receiving unit transmits the email output with the information converting unit to the server-side communication device.

7 Claims, 15 Drawing Sheets

ENTIRE STRUCTURE OF SYSTEM ACCORDING TO SECOND EMBODIMENT

ENTIRE STRUCTURE OF SYSTEM ACCORDING TO FIRST EMBODIMENT

Fig. 2

|  | higher layer | | | lower layer |
|---|---|---|---|---|
|  | first byte | second byte | third byte | fourth byte |
| xid | 0×00 | 0×00 | 0×04 | 0×D2 |
| mtype | 0×00 | 0×00 | 0×00 | 0×00 |
| rpcvers | 0×00 | 0×00 | 0×00 | 0×02 |
| prog | 0×20 | 0×00 | 0×00 | 0×00 |
| vers | 0×00 | 0×00 | 0×00 | 0×01 |
| proc | 0×00 | 0×00 | 0×00 | 0×01 |
| cred | 0×00 | 0×00 | 0×00 | 0×00 |
| verf | 0×00 | 0×00 | 0×00 | 0×00 |
| first parameter | 0×00 | 0×00 | 0×00 | 0×09 |
|  | 0×41 | 0×72 | 0×67 | 0×75 |
|  | 0×6D | 0×65 | 0×6E | 0×74 |
|  | 0×31 | 0×00 | 0×00 | 0×00 |
| second parameter | 0×00 | 0×01 | 0×81 | 0×CD |

INSTRUCTION INFORMATION ACCORDING TO FIRST EMBODIMENT

Fig. 3

```
From: <center1@dealer.com>
To: <prt1@user.net>
Subject: call
Date: Fri, 10 Oct 2003 11:11:22-0200
MIME-Version: 1.0
Content-Type: application/octet-stream;
 name="call"
Content-Transfer-Encoding : base64

AAAEogAAAAAAAACIAAAAAAAAAAEAAAAABAAAAAAAAAAAAAAAJQXJndW1lbnQxAAAAAAGBzQ==
```

EMAIL FORMAT OF INSTRUCTION INFORMATION ACCORDING TO FIRST EMBODIEMENT

Fig. 4

|  | higher layer | | | lower layer |
|---|---|---|---|---|
|  | first byte | second byte | third byte | fourth byte |
| xid | 0×00 | 0×00 | 0×04 | 0×D2 |
| mtype | 0×00 | 0×00 | 0×00 | 0×01 |
| resp_stat | 0×00 | 0×00 | 0×00 | 0×00 |
| verf | 0×00 | 0×00 | 0×00 | 0×00 |
| accept_stat | 0×00 | 0×00 | 0×00 | 0×00 |
| return value of procedure | 0×00 | 0×00 | 0×00 | 0×01 |

RESPONSE INFORMATION ACCORDING TO FIRST EMBODIEMENT

Fig. 5

```
From: <prt1@user.net>
To: <center1@dealer.com>
Subject: reply
Date: Fri, 10 Oct 2003 11:11:24-0200
MIME-Version: 1.0
Content-Type: application/octet-stream;
 name="reply"
Content-Transfer-Encoding : base64

AAAEOgAAAAEAAAAAAAAAAAAAAAAAAAB
```

EMAIL FORMAT OF RESPONSE INFORMATION ACCORDING TO FIRST EMBODIMENT

Fig. 6

| identifier | contents | time when client-side communication device transmits email | email address of client-side communication device |
|---|---|---|---|
| 1 | instruction informtion 1 | October 10, 2003  11:11:22 | center1@dealer.com |
| 2 | instruction informtion 1 | October 10, 2003  11:11:23 | center1@dealer.com |
| --- | --- | --- | --- |
| N | instruction information N | October 10, 2003  11:11:28 | center1@dealer.com |

DATA OF INSTRUCTION INFORMATION MEMORY UNIT ACCORDING TO FIRST EMBODIMENT

ORDER OF TRANSMITTING INSTRUCTION INFORMATION ACCORDING TO FIRST EMBODIMENT

ORDER OF PROCESSING INSTRUCTION INFORMATION
ACCORDING TO FIRST EMBODIMENT

ENTIRE STRUCTURE OF SYSTEM ACCORDING TO SECOND EMBODIMENT

Fig. 10

| identifier | contents |
|---|---|
| 1 | contents of transmitted email |
| 2 | contents of transmitted email |
| ---- | ---- |
| N | contents of transmitted email |

DATA OF TRANSMITTED INFORMATION MEMORY UNIT ACCORDING TO SECOND EMBODIMENT

Fig. 11

```
POST/log HTTP/1.1
Content-length: 288

From: <center1@dealer.com>
To: <prt1@user.net>
Subject: call
Date: Fri, 10 Oct 2003 11:11:22-0200
MIME-Version: 1.0
Content-Type: application/octet-stream;
name="call"
Content-Transfer-Encoding : base64

AAAEOgAAAAAAAAACIAAAAAAAAAAEAAAABAAAAAAAAAAAAJQxJndW1LbnQxAAAAAGBzQ==
```

COMMUNICATION CONTENTS WITH HTTP ACCORDING TO SECOND EMBODIMENT

ORDER OF TRANSMITTING INSTRUCTION INFORMATION
ACCORDING TO SECOND EMBODIMENT

ORDER OF PROCESSING INSTRUCTION INFORMATION
ACCORDING TO SECOND EMBODIMENT

ORDER OF RECORDING COMMUNICATION CONTENTS ACCORDING TO
SECOND EMBODIMENT

ORDER OF MONITORING EMAIL ACCORDING TO SECOND EMBODIMENT

COMMUNICATION DEVICE UTILIZING EMAIL FOR REMOTE PROCEDURE CALLS

BACKGROUND OF THE INVENTION

1. Field of the Invention

This invention relates to a communication device for executing a procedure requested with other communication device and more particularly, to a communication device in which a firewall is placed between the communication device and other communication device.

2. Description of Related Art

Various types of an information processing device have a communication function with development of information technology. For example, in an office, personal computers, printers, etc. are connected to each other through a communication line such as, e.g., a LAN (Local Area Network), and respectively function as a communication device. The communication device such as describe above can communicate not only data but also programs. The programs are communicated according to, e.g., a protocol referred to as a RPC (Remote Procedure Call). The RPC is defined as a system for calling a function exerted in other CPU among a plurality of different CPU. A standardized communication processing of the RPC is defined with a document, i.e., RFC (Request For Comments) 1831, issued by the IETF (Internet Engineering Task Force) (see Japanese Patent Application Publication No. JA-2003-114,805).

With the RPC as described above, the CPU functions as a communication device which receives instruction for execution of a prescribed procedure from the other communication device (other CPU) according to the protocol of the RPC. This communication device executes the prescribed procedure, and returns the results to other communication device. As described above, the communication device requested to execute the procedure from other device is referred to as a server-side communication device.

On the other hand, other communication device requests the execution of the procedure and receives the result. The communication device of this type is referred to as a client-side communication device (see Japanese Patent Application Publication No. JA-2003-114,805). In contrast, there has existed as one type of the communication devices such as having a function for notifying other communication device of its own internal status via an email (see Japanese Patent No. JA-3120,349). According to the invention, Japanese Patent No. JA-3120,349, it is possible to communicate via emails to other communication device outside, i.e., the firewall.

However, the above described arts have problems as follows. That is, it has been generalized in these years that organization such as, e.g., an enterprise, places the firewall between and an internal network and an external network.

The firewall is, herein, defined as an network intermediate device for restricting passable kinds of data and protocol for the purpose of preventing the communication device in the internal network from being controlling from the external network.

In the meantime, the communication in which a prescribed proceeding is rendered to execute from the outside, such as, e.g., the communication in accordance with the above described RPC, generally cannot pass through the firewall. Therefore, the communication device and other communication device as described above cannot be connected through the external network, so that a scope of the communication has been limited to an inside of the device or of the internal network, such as, e.g., the communication among a plurality of the CPU as described in Japanese Patent Application Publication No. JA-2003-114,805.

As described above, there has been such a problem that the existence of the firewall prevents the communication in using the RPC. On the other hand, as described in Japanese Patent No. JA-3120,349, with the regular email, messages can be transmitted but the execution of the proceeding according to the protocol such as, e.g., the RPC or the like can not requested.

SUMMARY OF THE INVENTION

This invention is mainly characterized in providing a communication device as described below. From one viewpoint, the communication device having an instruction information processing unit for executing a prescribed processing according to instruction information received from an exterior, has a mail transmitting and receiving unit for transmitting an email to and receiving the email from other communication device according to a prescribed email protocol, and an information converting unit in the mail transmitting and receiving unit, for receiving the email transmitted from other communication device, for retrieving instruction information for rendering the instruction information processing unit execute the prescribed proceeding from the email, for outputting the instruction information to the instruction information proceeding unit, for converting response information to the instruction information from the instruction information processing unit into a return email to the other communication device, in which the mail transmitting and receiving unit transmits the return email output with the information converting unit to the other communication device.

From another view point, the communication device having a response information proceeding unit for executing a prescribed processing according to response information received from an the exterior, has a mail transmitting and receiving unit for transmitting an email to and receiving the email from other communication device according to a prescribed email protocol, and an information converting unit for outputting the email to other communication device after converting the instruction information transmitted to other communication device into the email, for retrieving the response information transmitted from other communication device form the email received with the mail transmitting and receiving unit, for outputting the response information to the response information processing unit, in which the email transmitting and receiving unit transmits the email output with the information converting unit to the other communication device.

The communication device according to this invention has an advantage such as utilizing functions provided with other communication device inside a firewall from the exterior of the firewall.

A RPC protocol is applied as a communication protocol in embodiments. A purpose of actualizing functions of the RPC in a case where the firewall separates the RPC, is actualized upon using email protocol as a lower layer with respect to the RPC.

BRIEF DESCRIPTION OF THE DRAWINGS

This invention may take physical form in certain parts and arrangements of parts, a preferred embodiment and method of which will be described in detail in this specification and illustrated in the accompanying drawings which form a part hereof, and wherein;

FIG. 2 is an illustration of instruction information according to the first embodiment;

FIG. 3 is an illustration of email format of the instruction information according to the first embodiment;

FIG. 4 is an illustration of response information according to the first embodiment;

FIG. 5 is an illustration of email format of the response information of mail format according to the first embodiment;

FIG. 6 is an illustration of data of an instruction information memory unit according to the first embodiment;

FIG. 10 is an illustration showing data of a transmittance information memory unit according to the second embodiment;

FIG. 11 is an illustration of communication contents with a HTTP according to the second embodiment;

DETAILED DESCRIPTION OF PREFERRED EMBODIMENTS OF THE INVENTION

First Embodiment

Figure 1:
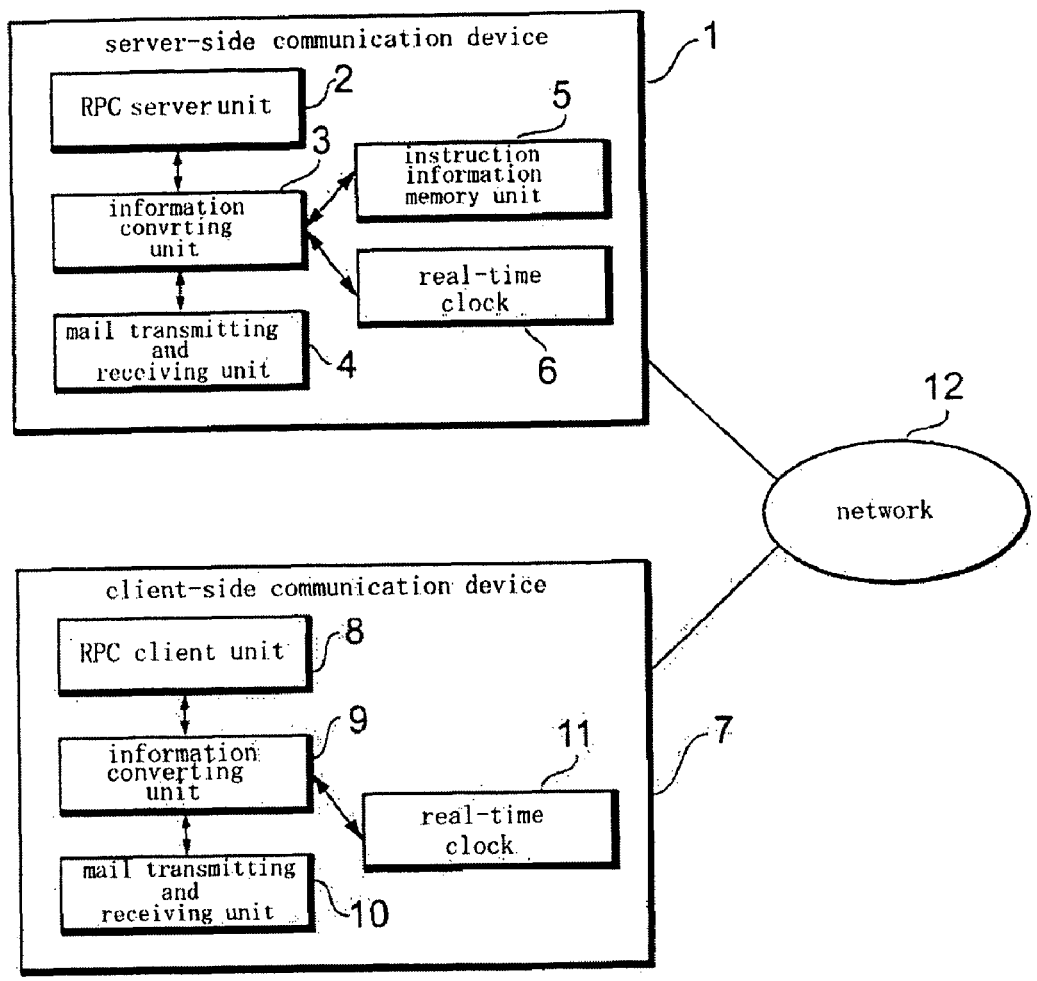
FIG. 1 is a block diagram showing an entire structure of a system according to the first embodiment.

FIG. 1 is a block diagram showing an entire structure of a system according to the first embodiment. In FIG. 1, a server-side communication device 1 and a client-side communication device 7 are respectively connected to a network 12. At an office, for example, the server-side communication device 1 is defined as, e.g., a printer while the client-side communication device 7 is defined as, e.g., a personal computer placed where a user using the printer exists.

The server-side communication device 1 provides a prescribed function to the client-side communication device 7. For example, where set as the printer, the server-side communication device 1 functions as a printer server with respect to the client-side communication device 7 such as, e.g., the personal computer or the like. Furthermore, the server-side communication device 1 has a RPC server unit 2, an information converting unit 3, a mail transmitting and receiving unit 4, an instruction information memory unit 5, and a real-time clock 6.

The RPC server 2 executes a prescribed procedure according to data in which a message type defined with the RPC is set to "zero". The above data are hereinafter referred to as instruction information. As described above, the RPC server unit 2 is defined as an instruction information processing unit for executing a prescribed processing according to the instruction information transmitted from an exterior, and the instruction information unit with application of the RPC server is one example. The RPC server 2 outputs, as an execution result, data in which a message type defined with the RPC is set to "one". The above data are hereinafter referred to as response information.

The information converting unit 3 retrieves the instruction information of the RPC from the email and converts the response information of the RPC into a return email. The mail transmitting and receiving unit 4 transmits and receives the email with use of a SMTP (Simple Mail Transfer Protocol) defined with the RFC 2821 and a POP 3 (Post Office Protocol Version 3) defined with the RFC 1939 respectively as the IETE standard.

The instruction information memory unit 5 memorizes the instruction information. The real-time clock maintains a geographical standard time zone (referred to as a "time zone" hereinafter) to which the server-side communication device 1 belongs as well as current time in the time zone.

The client-side communication device 7 utilizes a prescribed function provided with the server-side communication device 1. The client-side communication device 7 has a RPC client unit 8, an information converting unit 9, a mail transmitting and receiving unit 10, and a real-time clock 11.

According to the instruction information of the RPC, the RPC client unit 8 requests the server-side communication device 1 to execute a procedure for actualizing a prescribed function. The information converting unit 9 converts the instruction information of the RPC into the email and retrieves the response information of the RPC from the email. The RPC client unit 8 receives the response information transmitted form the RPC server unit 2 of the server-side communication 1 through the information converting unit 9, thereby executing the processing according to the response information. For example, where the printer is requested to print, a message of the result is displayed on a screen. As described above, the RPC client unit 8 is defined as a response information processing unit for executing a prescribed processing according to the response information received from the exterior, and the response information processing unit with application of the RPC protocol is one example.

The mail transmitting and receiving unit 10 transmits and receives the email in using the SMTP and the POP 3. The real-time clock 11 maintains the time zone to which the client-side communication device 7 belongs as well as current time in the time zone.

Herein, a method for describing the instruction information and the response information respectively defined with the RPC on the email is described. In this embodiment, a message type defined with MIME (Multipurpose Internet Mail Extensions) defined with the RFC 2025, the RFC 2046, and the RFC 2047, and the RFC 822 respectively as the IETF standard.

Therefore, on the email, a kind of contents of the instruction information and the response information is declared as an application/octet-stream defined with the RFC 2045, the RFC 2046, and the RFC 2047 as the IETF standard. Furthermore, data of the email in which these information are described are encoded based on a base64 encoding method defined with the above standard as well.

On the RPC server unit 2, a program number, a program version number, a procedure number, the number and type of parameter for each function and procedure, and a return value of each procedure are previously set between the RPC server unit 2 and the RPC client unit 8.

In particular, the information shown in FIG. 2 and FIG. 4 are set as follows. A communication transaction number, xid, defined with the RPC is set to, e.g., 1234. A RPC version number, rpcvers, defined with the RPC is set to, e.g., 2.

A program number, prog, defined with the RPC is set to, e.g., 536870912. A program version number, vers, defined with the RPC is set to, e.g., 1.

A procedure number, poc, defined with the RPC is set to, e.g., 1. A client authentication method, cred, defined with the RPC is set to, e.g., 0. A message authentication method, verf, defined with the RPC is set to, e.g., 0.

This procedure has two parameters. A type of the first parameter is a string on a XDR (External Data Representation Standard) defined with the RFC 1832 as the IETF standard. A type of the second parameter is an unsigned integer on the XDR.

Furthermore, a type of the return value is an unsigned integer on the XDR. With the procedure thus defined, the execution of the procedure is instructed in a condition that the first parameter value is set to "Argument1" while the second parameter value is set to "98765".

The instruction information in this case is shown in FIG. 2. The email in which the instruction information in this case is described according to the description method as described above, is shown in FIG. 3. Furthermore, the response information is shown in FIG. 4. The email in which this response information is described according to the description method as described above is shown in FIG. 5.

In the meantime, the email is delivered through a plurality of mail servers in many cases, while the intervenient mail servers and delivery paths does not necessarily stay constant.

Therefore, where the email protocol is used as the lower layer protocol of the RPC, there is a possibility that order that the client-side communication device transmits the instruction information and order that the server-side communication device receives the email including the instruction information are not coincident with each other.

Thus, there exists such a problem that there is a possibility that the order that the client-side communication device transmits the instruction information and the order that the server-side communication device executes the procedure based on the instruction information are not coincident with each other.

To solver the above problem, the server-side communication device has the procedure for determining execution order of the procedure described in the received email according to a data field of a mail header defined with the RFC 822 as the IETF standard on the received email.

Therefore, the instruction information memory unit 5 as shown in FIG. 1 memorizes the instruction information to identify contents with an identifier. These contents are shown in FIG. 6.

Operation of First Embodiment

Figure 7:
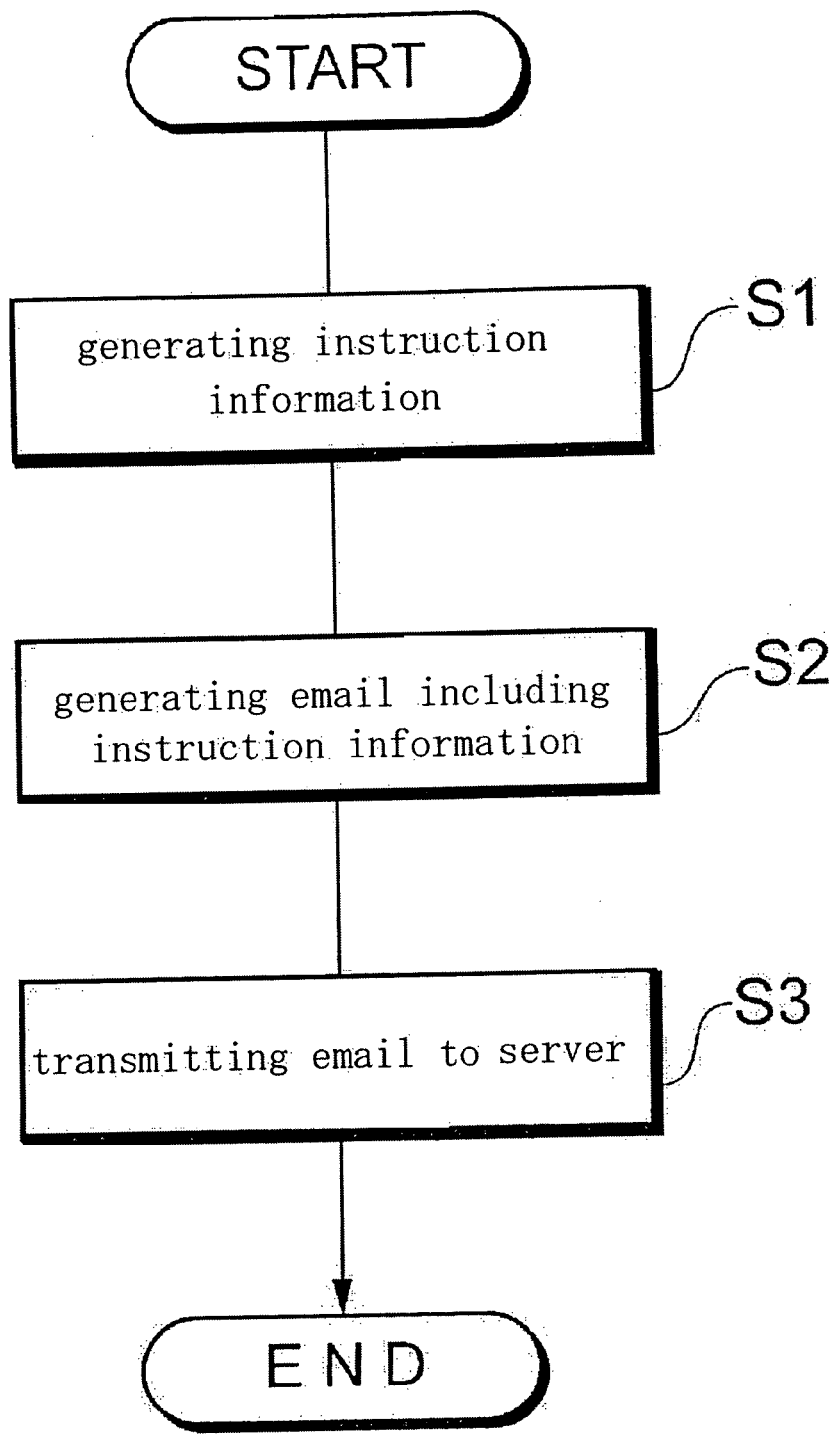
FIG. 7 is a flow chart for illustrating order of transmitting the instruction information according to the first embodiment.

Operation is next explained, in which the client-side communication device transmits the instruction information to the server-side communication device. FIG. 7 is a flow chart for illustrating order of transmitting the instruction information according to the first embodiment.

First, the RPC client unit 8 of the client-side communication device 7 generates the instruction information for instructing the execution of the prescribed procedure at the step S1.

The information converting unit 9 generates the email including the instruction information in accordance with the email format at the step S2. In this bout, the information converting unit 9 obtains the time zone to which the client-side communication device belongs as well as current time from the real-time clock 11, thereby describing the time zone and the current time on the data field of the mail header defined with the RFC822 (see FIG. 3). Furthermore, the information converting unit 9 describes an email address of the server-side communication device on a To field of the mail header defined with the RFC 822 (see FIG. 3).

Thereafter, the mail transmitting and receiving unit 10 transmits the email including the above instruction information to the mail server with use of the SMTP at the step S3.

Figure 8:
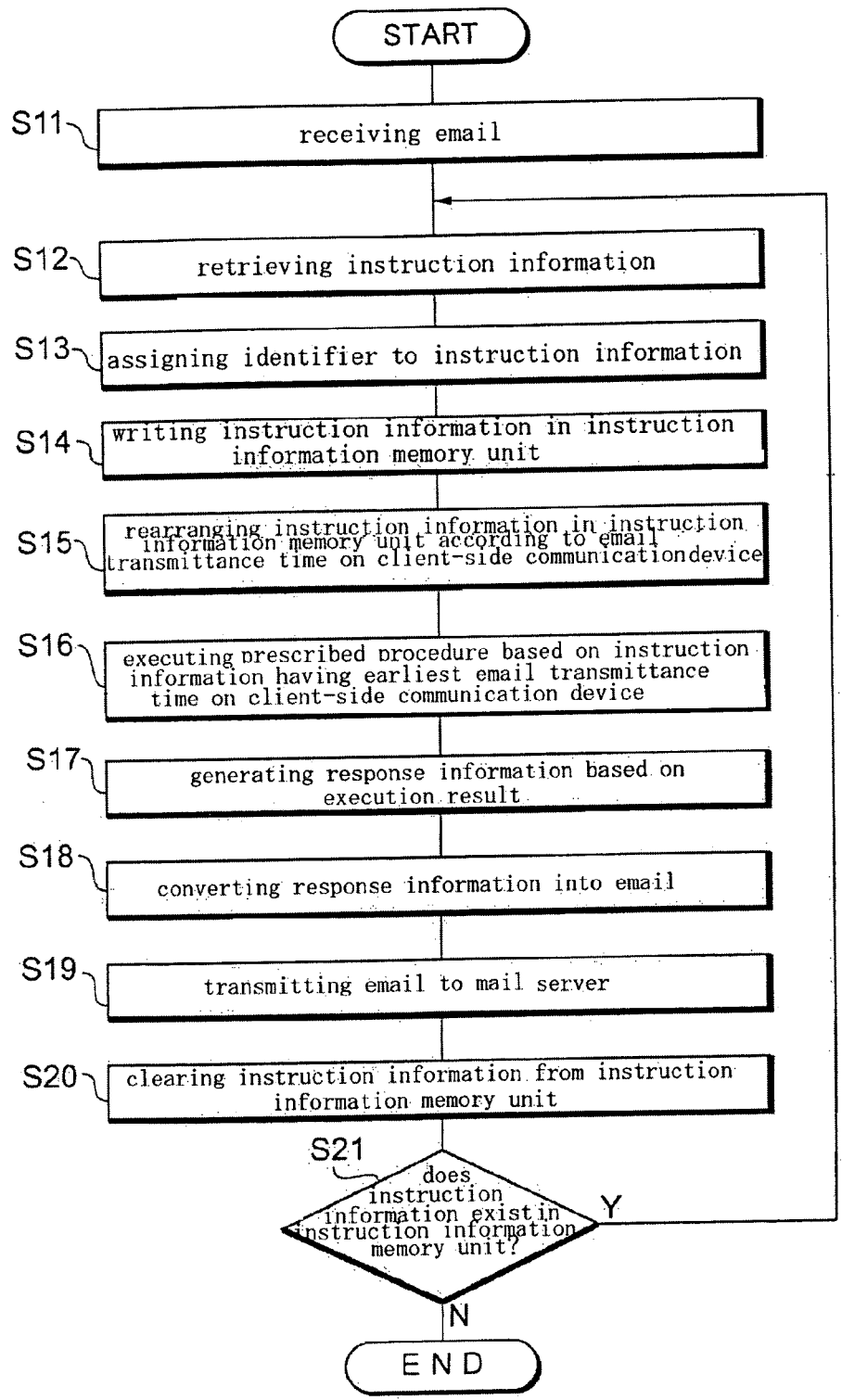
FIG. 8 is a flow chart for illustrating order of proceeding the instruction information according to the first embodiment.

Operation is next explained, in which the server-side communication device 1 processes the email including the above instruction information. FIG. 8 is a flow chart for illustrating this operation.

At the step S11, the mail transmitting and receiving unit 4 of the server-side communication device 1 receives the email from the mail server in using the POP 3 at prescribed time intervals, thereby passing the received email to the information converting unit 3.

The information converting unit 3 retrieves the instruction information from the received email according to the email format at the step S12. In this bout, the information converting unit 3 obtains the time zone to which the client-side communication device 7 belongs as well as the time in the time zone, when the client-side communication device 7 transmits the email, form the data field of the mail header of the received email.

In this situation, the information converting unit 3 converts the above time into the time in the time zone to which the server-side communication device 1 belongs, and thereafter uses the converted time as the time when the client-side communication device 7 returns the email.

Furthermore, the information converting unit 3 obtains the email address of the client-side communication device 7 from a From field of the mail header of the received email.

The information converting unit 3 assigns the uniquely identifiable identifier to the instruction information at the step S13, thereby writing, at the step S14, the instruction information in the instruction information memory unit 5, in relationship to the time when the client-side communication device 7 transmits the email as well as the email address of the client-side communication device 7. In this bout, the information converting unit 3 rearranges, at the step S15, the instruction information as shown in FIG. 6, inside the instruction information memory unit 5, based on the time when the client-side communication device 7 transmits the email.

The information converting unit 3 retrieves the single instruction information having the earliest time when the client-side communication device 7 transmits the email from the instruction information memory unit 5, and requests the processing to the RPC server unit 2 at the step S16. The RPC sever unit 2 executes the prescribed procedure based on the above instruction information, thereby returning the response information to the information converting unit 3 based on the execution result at the step S17.

The information converting unit 3 converts the response information into the email according to the email format at the step S18, and outputs the email to the mail transmitting and receiving unit 4 at the step S19 on the condition that the email address of the client-side communication 7 which transmitted the instruction information is designated as the destination address.

With respect to the example as shown in FIG. 3, the response is returned on the condition that the response status represented by resp_stat, defined with the RPC is set to 0, the message authentication method represented by verf, defined with the RPC is set to 0, the acceptance status represented by accept_stat, defined with the RPC is set to 0, and the return value of the procedure is set to 1. This response information is shown in FIG. 4, as described above. Furthermore, the email in which this response information is described according to the above description method is shown in FIG. 5.

The mail transmitting and receiving unit 4 transmits this email to the mail server in using the SMTP. After the transmittance of the email to the mail server is completed, the mail transmitting and receiving unit 4 notifies the information converting unit 3 that the transmittance of the email is completed. According to this notification, the information converting unit 3 cleans the above instruction information corresponding to the above response information from the instruction information memory unit 5 at the step S20. The RPC server unit 2, the information converting unit 3, and the mail transmitting and receiving unit 4 repeat the above described processing for all instruction information stored in the instruction information memory unit 5 at the step S21.

Effect of First Embodiment

As described above, according to this invention, the communication device outside the firewall can render the communication device inside the firewall execute the prescribed procedure.

Furthermore, after the server-side communication device rearranges the instruction information according to the email transmittance time at the client-side communication device, to execute the procedure described in the instruction information, as the instruction information having the earliest transmittance time is transmitted first, the server-side communication device executes a plurality of the procedures in series depending on the order of the execution, such as, e.g., procedure of restart after change of setting, in the order intended with the client-side communication device.

Second Embodiment

Where the email protocol is adopted as the lower layer protocol with respect to the RPC, there is such a problem that where arrival of the email including the response information on the client-side communication device is delayed, it is uncertain as to whether a transfer of email or the execution of the procedure on the server-side communication device takes time. To solve the above problem, the communication device is structured so that the status of email transmittance and reception at the server-side communication device can be confirmed with a HTTP (Hypertext Transfer Protocol) defined with the RFC2616 and a FTP (File Transfer Protocol) defined with the RFC959. This embodiment is described hereafter.

Figure 9:
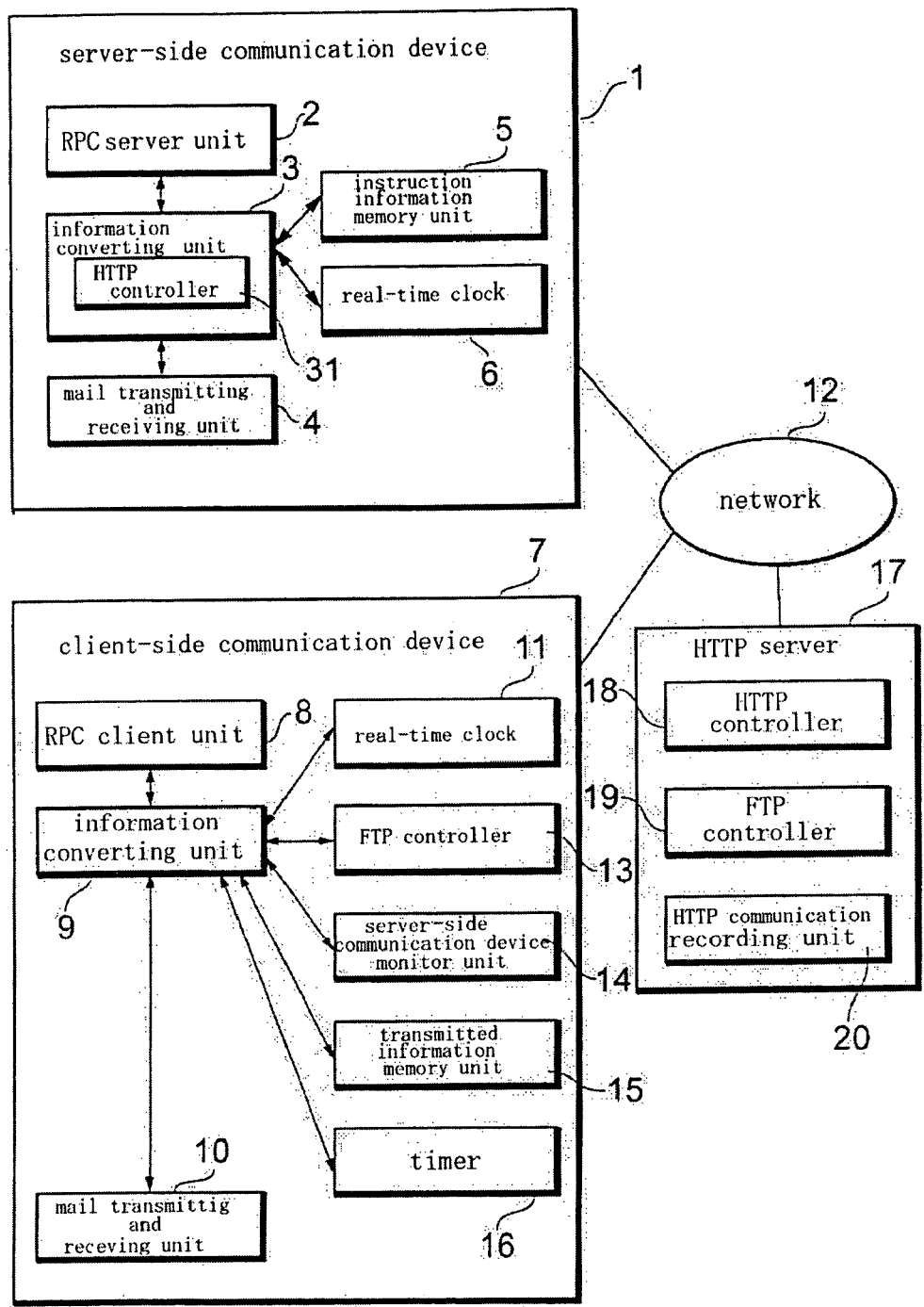
FIG. 9 is a block diagram showing an entire structure of a system according to the second embodiment.

FIG. 9 is a block diagram showing an entire structure of a system according to the second embodiment. In FIG. 1, the server-side communication device 1 and the client-side communication device 7 are respectively connected to the network 12. Furthermore, a HTTP server 17 is connected to the network 12.

The server-side communication device 1 provides the client-side communication device 7 with the prescribed function. This server-side communication device 1 has the RPC server unit 2, the information converting unit 3, the mail transmitting and receiving unit 4, the instruction information memory unit 5, and the real-time clock 6.

The RPC server unit 2 is the same as that according to the first embodiment. The information converting unit 3 retrieves the instruction information of the RPC from the email, thereby converting the response information of the RPC into the return email. The information converting unit 3 has a HTTP controller 31. The HTTP controller 31 connects the server-side communication unit 1 to the HTTP server 17, and notifies the HTTP server of contents output with the information converting unit 3.

The mail transmitting and receiving unit 4, the instruction information memory unit 5, and the real-time clock 6 are the same as those according to the first embodiment. The client-side communication device 7 utilizes the prescribed function provided with the serve-side communication device 1. This client-side communication device 7 has the RPC client unit 8, the information converting unit 9, the mail transmitting and receiving unit 10, the real-time clock 11, a FTP controller 13, a server-side communication device monitor unit 14, a transmitted information memory unit 15, and a timer 16.

The RPC client unit 8 is the same as that according to the first embodiment. The information converting unit 9 retrieves the response information of the RPC from the email and converts the instruction information into the email The mail transmitting and receiving unit 10 and the real-time clock 11 are the same as those according to the first embodiment. The FTP controller 13 controls the communication in using the FTP. The server-side communication device monitor unit 14 monitors the status of the email transmittance and reception at the server-side communication device 1.

The transmitted information memory unit 15 memorizes the transmitted email. The timer 16 keeps time. The HTTP server 17 performs communication with the server-side communication device 1 in using the HTTP. Furthermore, the HTTP server 17 performs communication with the client-side communication device 7 in using the FTP.

The HTTP controller 18 controls communication in using the HTTP. The FTP controller 19 controls communication in using the FTP. A HTTP communication memory unit 20 maintains contents of communication with the HTTP.

Herein, the method for describing the instruction information and the response information defined with the RPC on the email is as described in the first embodiment. As described in the first embodiment, furthermore, on the RPC server unit 2, the program number, the program version number, the procedure number, the number and type of parameter for each function and procedure, and the return value of each procedure are previously set between the RPC server unit 2 and the RPC client unit 8.

Operation of Second Embodiment

Figure 12:
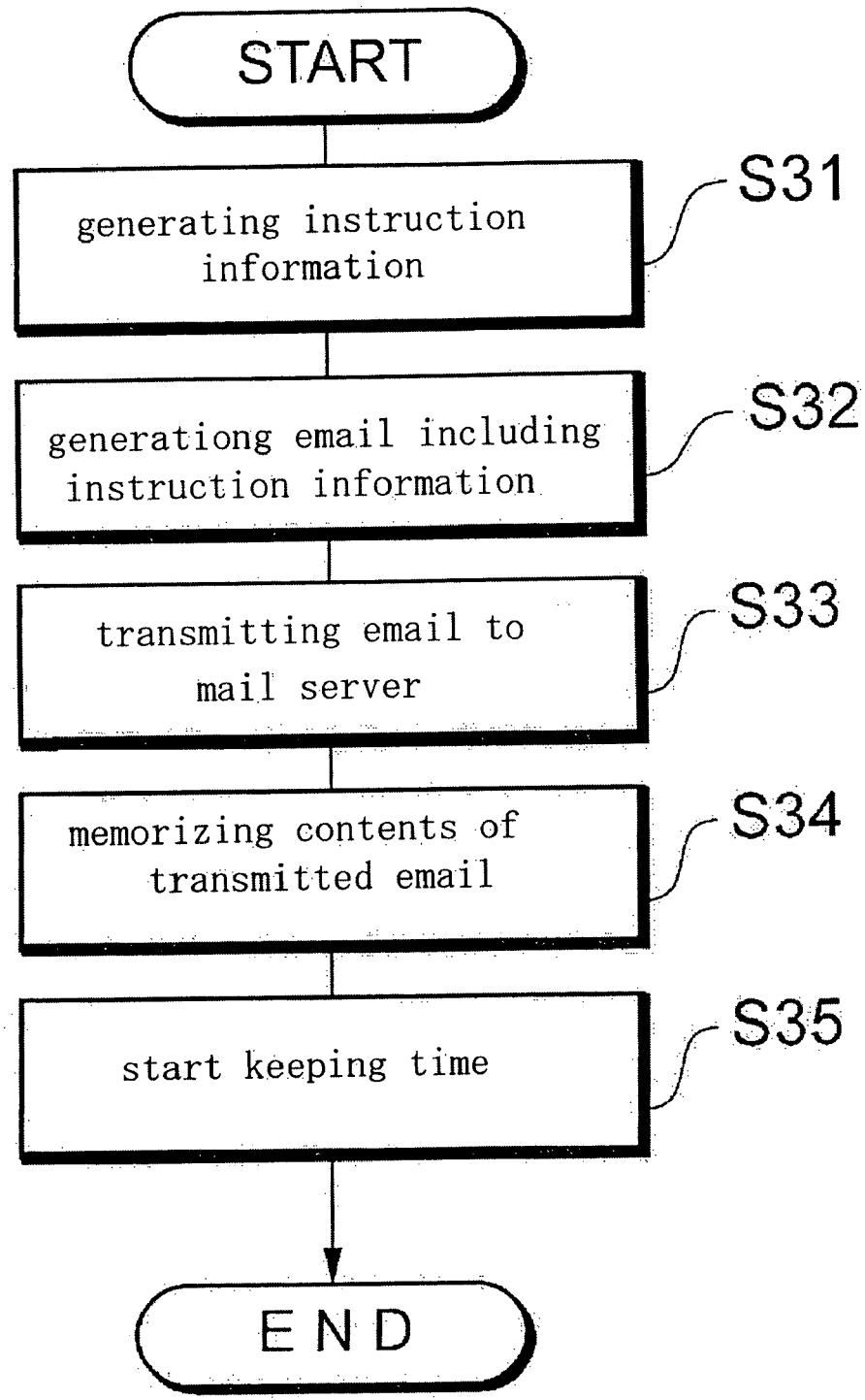
FIG. 12 is a flow chart illustrating order of transmitting instruction information according to the second embodiment.

Next, operation is described, in which the client-side communication device transmits the instruction information to the server-side communication device. FIG. 12 is a flow chart illustrating order of transmitting the instruction information according to the second embodiment.

The RPC client unit 8 of the client-side communication unit 7 first generates the instruction information for instructing the execution of the prescribed procedure at the step S31.

The information converting unit 9 generates the email including the above instruction information according to the email format at the step S32. In this bout, the information converting unit 9 obtains the time zone as well as the current time to which the client-side communication device belongs from the real-time clock 11, thereby describing the time zone and the current time on the data field of the mail header defined with the RFC822 (see FIG. 3). Furthermore, the information converting unit 9 describes an email address of the server-side communication device on a To field of the mail header defined with the RFC 822 (see FIG. 3).

Thereafter, the mail transmitting and receiving unit 10 transmits the email including the instruction information to the mail server with use of the SMTP at the step S33. When transmittance of the email to the mail server is completed, the mail transmitting and receiving unit 10 notifies the information converting unit 9 of the status that transmittance is completed as well as contents of the transmitted email. The information converting unit 9 assigns the uniquely identifiable identifier to the transmitted email, thereby writing the identifier and the contents of the transmitted email in the transmitted information memory unit 15. A structure of the data of the transmitted information memory unit 15 is shown in FIG. 10.

Furthermore, the information converting unit 9 requests the timer 16 to keep prescribed time with respect to the identifier. The timer 16 starts keeping the prescribed time with respect to the identifier.

Figure 13:
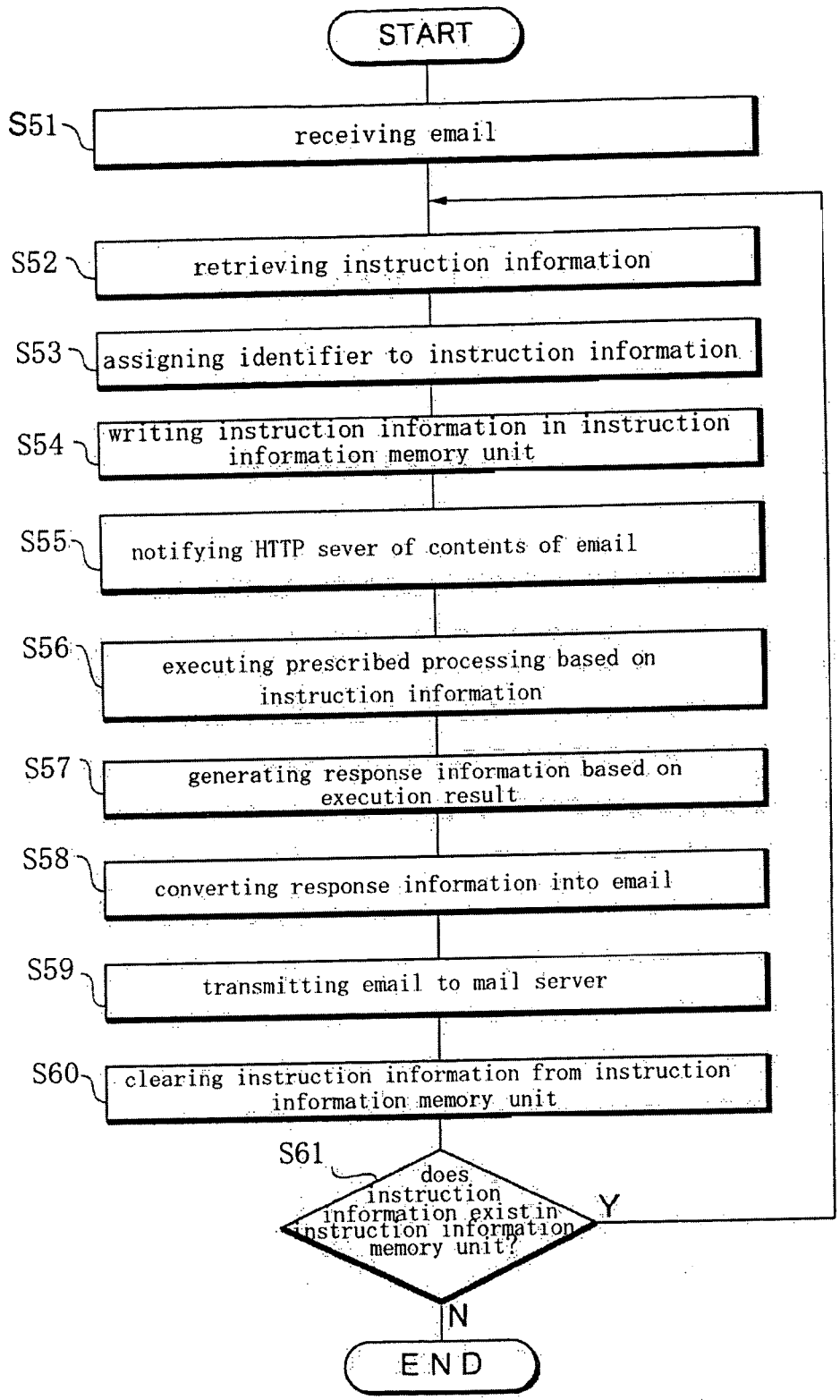
FIG. 13 is a flow chart illustrating order of proceeding the instruction information according to the second embodiment.

Next, operation is explained, in which the server-side communication device 1 processes the email including the above instruction information. FIG. 13 is a flow chart illustrating this operation. The mail transmitting and receiving unit 4 of the server-side communication device 1 receives the email at prescribed intervals from the mail server, in using the POP 3 at the step S51, and passes the received email to the information converting unit 3.

The information converting unit 3 retrieves the instruction information from the received email according to the above email format at the step S52. The information converting unit 3 analyzes the From field of the mail header of the received email, thereby obtaining the email address of the client-side communication device.

The information converting unit 3 assigns the uniquely identifiable identifier to the instruction information at the step S53, and writes the instruction information in relationship to the email address of the client-side communication device 7 in the instruction information memory unit 5 at the step S54.

Furthermore, the information converting unit 3 is connected to the HTTP server 17 with the HTTP controller 17, and notifies the HTTP server of the contents of the received email according to a POST method defined with the HTTP at the step S55. In this situation, the information converting unit 3 describes a size of the received email in terms of bytes on a Content-Length header defined with the HTTP. FIG. 11 shows an example of the contents of the communication in using the HTTP in a case where the server-side communication device 1 notifies the HTTP server 17 of the reception of the email as shown in FIG. 3.

The information converting unit 3 reads single instruction information form the instruction information memory unit 5 and requests the RPC server unit 2 to execute the procedure at the step S56. The RPC server unit 2 executes the prescribed procedure based on this instruction information, thereby returning the response information based on the execution result to the information converting unit 3 at the step S57.

The information converting unit 3 converts the response information into the email in accordance with the email format at the step S58, thereby outputting at the step S59 this instruction information to the mail transmitting and receiving unit 4 in the condition that the email address of the client-side communication device 7 is designated as the destination address.

The mail transmitting and receiving unit 4 transmits the above email to the mail server with use of the SMTP. After the email transmittance to the mail server is completed, the mail transmitting and receiving unit 4 notifies the information converting unit 3 the status that the transmittance of the email is completed. According to this notification, the information converting unit 3 clears the above instruction information corresponding to the above response information from the instruction information memory unit 5 at the step S60. The RPC server unit 2, the information converting unit 3, and the mail transmitting and receiving unit 4 repeat the above described processing for all of the instruction information stored in the instruction information memory unit 5 at the step S61.

Figure 14:
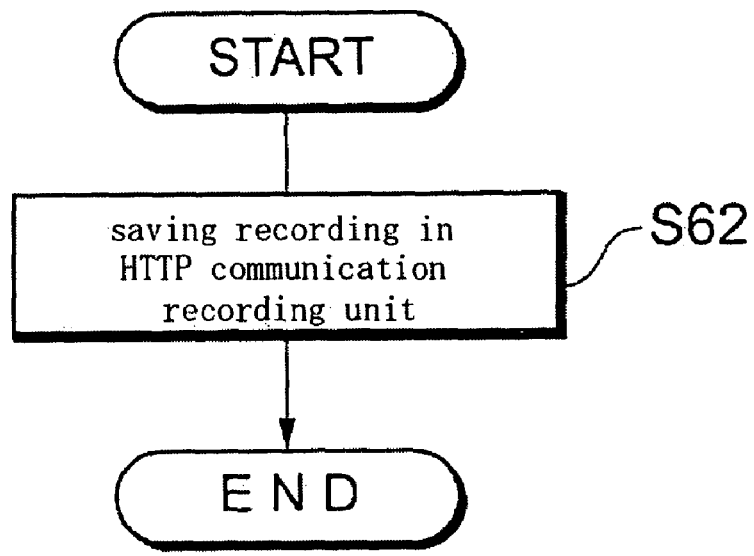
FIG. 14 is a flow chart illustrating order of recording communication contents according to the second embodiment.

Operation of the HTTP server is described next. FIG. 14 is a flow chart illustrating operation in which the HTTP server records the contents of the communication with the server-side communication device. With the HTTP controller 18, the HTTP server 17 communicates with the server-side communication device 1. The HTTP server 17 records one by one the contents of the communication with the server-side communication device in the HTTP communication recording unit 20 at the step S62.

On the other hand, the HTTP server 17 communicates with the FTP controller 13 of the client-side communication device 7 in using the FTP controller 19, and when the client-side communication device 7 requests, with a RETR command defined with the FTP, the HTTP server 17 to transmit recording stored in the HTTP communication recording unit 20, the HTTP server 17 transmits the recording to the client-side communication device 7.

Figure 15:
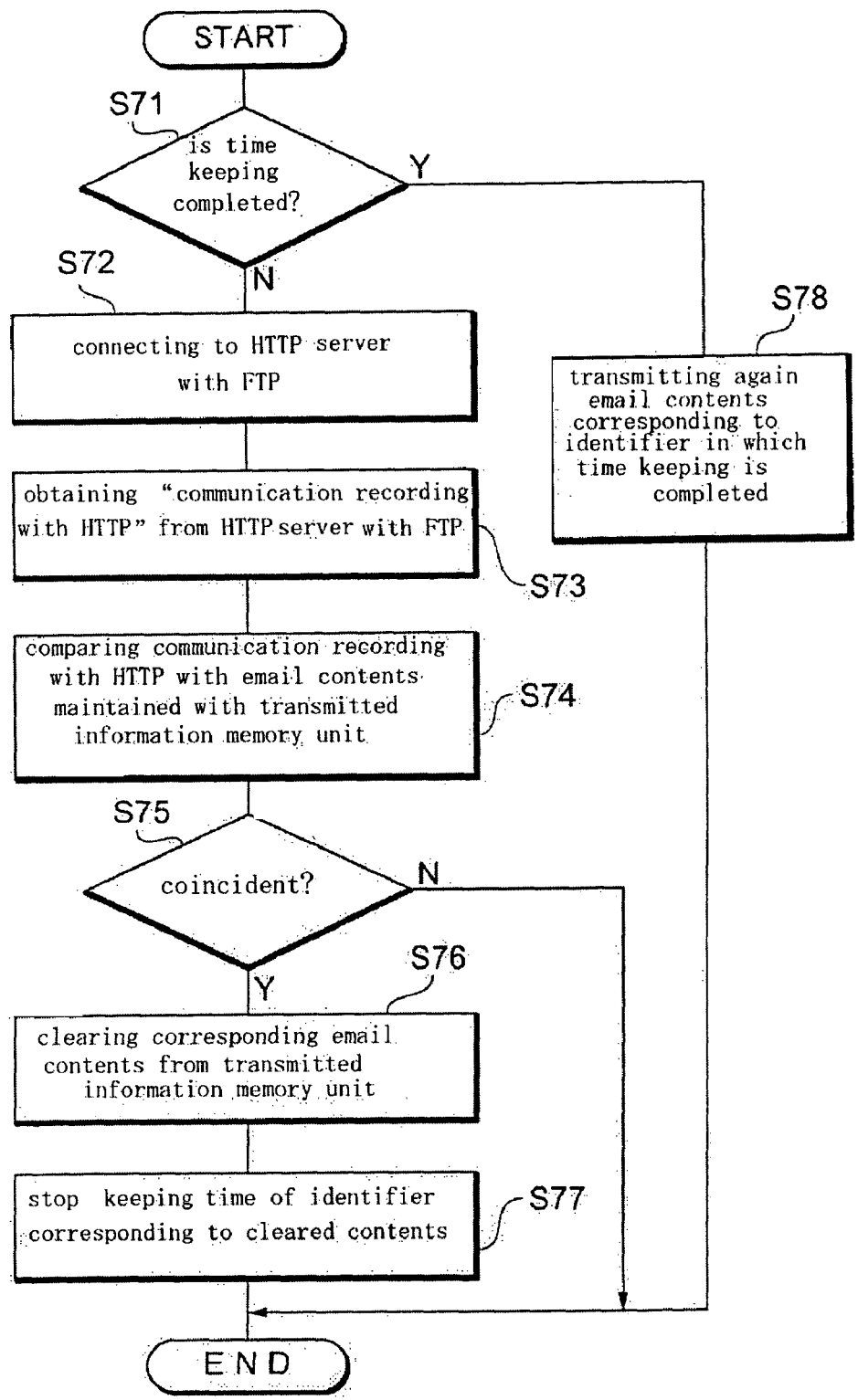
FIG. 15 is a flow chart illustrating order of monitoring an email according to the second embodiment.

Next, operation is described, in which the client-side communication device monitors as to whether the transmitted email arrives on the server-side communication device. FIG. 15 is a flow chart illustrating this operation.

The server-side communication device monitor unit 14 of the client-side communication device 7 communicates with the FTP controller 19 of the HTTP server 17 at prescribed time intervals with use of the FTP controller 13 at the step S71 and the step S72, thereby obtaining communication recording performed with the HTTP server at the step S73. The server-side communication device monitor unit 14 analyzes the information of the recording.

That is, the server-side communication device monitor unit 4 makes a comparison between the email contents maintained with the transmitted information memory unit 15 and the above information at the step S74, and makes a judgment as to whether the email contents and the information are coincident with each other at the step S75. Where the email contents and the information are coincident with each other, the server-side communication monitor unit 14 clears the corresponding email contents from the transmitted information memory unit 15 at the step S76 while stopping the timer 16 from keeping time of the identifier corresponding to the above email contents at the step S77.

On the other hand, at the step S72, where the timer 16 completes keeping time of an identifier before stopped from keeping time by the server-side communication device 14, the timer 16 notifies the information converting unit 9 of the status that the time keeping is completed as well as this identifier. According to this notification, the information converting unit 9 transmits again the email corresponding to the identifier at the step S78.

Effect of Second Embodiment

As described above, according to this invention, the communication device outside the firewall can render the communication device inside the firewall execute the prescribed procedure.

The sever-side communication device notifies the HTTP server of the status of the email transmittance and reception, and the client-side communication device monitors this status, so that the client-side communication device can monitor as to whether the email transmitted from the client-side communication device arrives on the server-side communication device, while risk of loss of emails can be reduced since where the email does not arrive on the server-side communication device within prescribed time, the client-side communication device transmits again this email.

Other Embodiments

The communication device with application of the RPC protocol is explained in each embodiment described above to abide by the international standard as a matter of practical convenience, but this invention is not limited to those embodiments. That is, the communication device according to this invention is characterized in having an information processing unit for executing a prescribed processing according to the instruction information and the response information transmitted from an external. Thus, this invention is applicable to the communication device with use of any communication protocol.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention should not be limited by the specification, but be defined by the claims set forth below.

What is claimed is:

1. A communication device including a computer readable storage medium comprising:
    a response information processing unit configured to execute a prescribed function according to response information received from another communication device;
    a mail transmitting and receiving unit configured to transmit and receive emails to and from the other communication device with use of a prescribed email protocol; and
    an information converting unit configured to:
        (i) convert and output, as an email, instruction information to be transmitted to the other communication device,
        (ii) retrieve, from an email received by the mail transmitting and receiving unit, the response information transmitted from the other communication device, and
        (iii) output the response information to the response information processing unit,
    wherein the mail transmitting and receiving unit is configured to transmit, to the other communication device, the email outputted from the information converting unit containing the instruction information, and
    wherein the information converting unit is further configured to store contents of the email transmitted by the mail transmitting and receiving unit and compare the contents with log information stored in an external network server device, the stored log information being received by the external network server device from the other communication device.

2. A communication device including a computer readable storage medium comprising:
    a Remote Procedure Call (RPC) client unit configured to process communication according to an RPC protocol;
    a mail transmitting and receiving unit configured to transmit and receive emails to and from another communication device; and
    an information converting unit configured to:
        (i) convert and output, as an email, instruction information to be transmitted to the other communication device,
        (ii) retrieve, from an email received by the mail transmitting and receiving unit, response information transmitted from the other communication device, and
        (iii) output the response information to the RPC client unit,
    wherein the mail transmitting and receiving unit is configured to transmit, to the other communication device, the email outputted from the information converting unit containing the instruction information, and
    wherein the information converting unit is further configured to store contents of the email transmitted by the mail transmitting and receiving unit and compare the contents with log information stored at an external Hypertext Transfer Protocol (HTTP) server device, the stored log information being received by the external HTTP server device from the other communication device.

3. The communication device according to claim 1, wherein the information converting unit has a communication unit configured to obtain the stored log information from the external network server device and the other communication device, and record the stored log information obtained by the communication unit.

4. The communication device according to claim 1, wherein the information converting unit is further configured to:
    (iv) start keeping prescribed time when the mail transmitting and receiving unit completes transmission of the email including the instruction information, and
    (v) resend the email including the instruction information to the mail transmitting and receiving unit where comparison of the email contents with the stored log information of the external network server device indicates that the email including the instruction information has not been received by the other communication device, even when said time keeping is completed.

5. The communication device according to claim 2, wherein said information converting unit has a communication unit configured to obtain the stored log information from the external HTTP server device, and record the stored log information obtained by the communication unit.

6. The communication device according to claim 2, wherein the information converting unit is further configured to:
    (iv) start keeping prescribed time when the mail transmitting and receiving unit completes transmission of the email including the instruction information, and
    (v) resend the email including said instruction information to the mail transmitting and receiving unit where comparison of the email contents with the stored log information of the external HTTP network device indicates that the email including the instruction information has not been received by the other communication device, even when said time keeping is completed.

7. The communication device according to claim 6, wherein the other communication device includes an information converting unit configured to send contents of a received email to the external HTTP server device for storage as log information when the information converting unit of the other communication device determines that the received email includes the instruction information.

* * * * *